United States Patent

[11] 3,627,821

| [72] | Inventors | Kurt Sennewald; Wilheim Vogt, both of Knapsack near Cologne; Heinz Erpenbach, Suert near Cologne; Hermann Glaser, Knapsack near Cologne; Helmut Dyrschka, Koettingen, all of Germany |
|---|---|---|
| [21] | Appl. No. | 784,872 |
| [22] | Filed | Dec. 18, 1968 |
| [45] | Patented | Dec. 14, 1971 |
| [73] | Assignee | Knapsack Aktiengesellschaft Knapsack bei Cologne, Germany |
| [32] | Priority | Dec. 23, 1967 |
| [33] | | Germany |
| [31] | | P 16 68 350.4 |

[54] PROCESS FOR THE MANUFACTURE OF UNSATURATED ESTERS OF CARBOXYLIC ACIDS
7 Claims, No Drawings

[52] U.S. Cl. .................................................. 260/497 A, 252/431 C, 260/410, 260/410.9 N, 260/476 R
[51] Int. Cl. .................................................. C07c 69/14

[50] Field of Search............................................ 260/497, 497 A, 410.9, 476; 252/411

[56] References Cited
UNITED STATES PATENTS

| 2,625,519 | 1/1953 | Hartig ........................ | 260/533 |
|---|---|---|---|
| 2,649,477 | 8/1953 | Jacobs et al. ................ | 260/533 |

FOREIGN PATENTS

| 1,003,347 | 9/1965 | United Kingdom ......... | 260/497 |
|---|---|---|---|
| 1,146,707 | 3/1969 | United Kingdom ......... | 260/497 |

Primary Examiner—Lorraine A. Weinberger
Assistant Examiner—Richard D. Kelly
Attorney—Curtis, Morris and Safford ABSTRACT: Production of unsaturated esters of carboxylic acids by reaction of an olefinic compound and an aliphatic or aromatic carboxylic acid, which each contain from two to 20 carbon atoms, with molecular oxygen or air, in the gas phase, at elevated temperature and in contact with a carrier catalyst, the reaction being carried out in contact with a carrier catalyst containing palladium acetate, alkali metal acetate and one or more uranium compounds as its active constituents.

PROCESS FOR THE MANUFACTURE OF UNSATURATED ESTERS OF CARBOXYLIC ACIDS

It is known that unsaturated esters of carboxylic acids can be produced by reaction of an olefinic compound and an aliphatic or aromatic carboxylic acid with molecular oxygen or air in the gas phase, at elevated temperature, and in contact with a carrier catalyst containing one or more compounds of ruthenium, rhodium, palladium, osmium, iridium or platinum, if desired in combination with one or more compounds of copper, silver, gold, zinc, cadmium, tin, lead, chromium, molybdenum, tungsten, manganese, iron, cobalt or nickel, and in further combination with one or more alkali metal or alkaline earth metal carboxylates. The reaction occurs in accordance with the known summation equation: $R-CH=CH-R'+R''-COOH+0.5\ O_2 \rightarrow R''-COOCR=CH-R'+H_2O$, in which R, R' and R'' stand for hydrogen or aliphatic, cycloaliphatic or aromatic radicals containing up to 17 carbon atoms. For example, the technically very interesting product vinyl acetate can be produced by reaction of ethylene, acetic acid and oxygen.

In view of the high price of the catalysts, which is incurred by their noble metal content, it is highly desirable for the economic use of the process to have a catalyst which combines long lifetime with good space/time yields and produces generally good yields.

The present invention now provides a process for the manufacture of unsaturated esters of carboxylic acids by reaction of an olefinic compound and an aliphatic or aromatic carboxylic acid, each of which contains from 2 to 20 carbon atoms, with molecular oxygen in the gas phase, at elevated temperature and in contact with a carrier catalyst, which process comprises using a carrier catalyst containing palladium acetate, alkali metal acetate and one or more uranium compounds as its active constituents.

The carrier catalyst can contain silicic acid, kieselguhr, silica gel, diatomaceous earth, aluminum oxide, aluminum silicate, aluminum phosphate, pumice, silicon carbide, asbestos or active carbon as the carrier material, and between 0.1 and 20, preferably between 0.2 and 10, percent by weight palladium acetate, between 0.1 and 20, preferably between 0.2 and 10, percent by weight alkali metal acetate, and between 0.1 and 10, preferably between 0.2 and 8, percent by weight of one or more uranium compounds as the active constituents, uranyl acetate being particularly preferred.

The olefinic compound containing from 2 to 20 carbon atoms is preferably an aliphatic or cycloaliphatic olefin or diolefin, more preferably ethylene, propylene, butene, butadiene, pentene, cyclopentadiene, cyclohexene or cyclohexadiene, and the carboxylic acid containing from 2 to 20 carbon atoms is preferably acetic acid, propionic acid, butyric acid, isobutyric acid, valeric acid, lauric acid, palmitic acid, stearic acid or benzoic acid.

The catalyst is prepared by impregnating the carrier with an aqueous, acetic acid solution of palladium acetate, the uranium compounds, e.g. uranyl acetate, and alkali metal acetate. After having been impregnated, the catalyst is dried in a vacuum drying cabinet, at about 50° C. As a result of the different solubility firstly of palladium acetate and secondly of uranyl acetate, it may become necessary to use the palladium acetate in the form of a solution in pure acetic acid, impregnate the carrier therewith and intermediarily dry it, then impregnate the dried carrier again, this time with an aqueous solution, for example of uranyl acetate and alkali metal acetate. The sequential order of the impregnation and the type of solvent used are not critical for the present invention. After having been dried, the powdery catalyst spread out in a thin layer, which is repeatedly turned, can be activated by irradiation with ultraviolet and/or visible light, for a period of time between 30 and 10 hours. In order to produce an effect, it is generally necessary for the catalyst to absorb per liter a quantity of light between 0.1 and 100, preferably between 1 and 50 watt-hours. A catalyst so treated enables the space/time yield obtainable therewith to be increased by 60 to 80 percent, as compared with the space/time yield obtainable with an unexposed catalyst. The catalyst treated in the manner described above is placed in a stainless steel tube and a gas mixture consisting of the olefin to undergo reaction, carboxylic acid in vapor form and oxygen is passed over it at temperatures between 120° and 250° C., preferably between 150° and 200° C., and under pressures between 0.5 and 20, preferably between 2 and 10, atmospheres absolute. The reaction mixture leaving the reactor is condensed to isolate the reaction products and recover unreacted carboxylic acid. For example, the reaction of ethylene as the olefin with acetic acid as the carboxylic acid at 180° C. and under a pressure of 6 atmospheres absolute in contact with a palladium acetate/uranyl acetate/potassium acetate-catalyst on a silicic acid carrier has been found to produce the following results: a space/time yield of 94 grams vinyl acetate per liter of catalyst per hour, for the unexposed catalyst, and a space/time yield of 160 grams vinyl acetate per liter of catalyst per hour, for the irradiated catalyst.

EXAMPLE 1

One liter of a silicic acid carrier, which had a BET-surface of 120 square meters/gram and an apparent desity of 0.52 kg./liter, was impregnated with a solution of 7.8 grams palladium acetate and 20 grams potassium acetate in 800 cc. pure acetic acid. The carrier was found practically to absorb the whole amount of liquid. The carrier so impregnated was dried in vacuo at 50° C. and was then ready for use. The carrier catalyst so make contained 1.5 percent by weight palladium acetate and 3.85 percent by weight potassium acetate.

The catalyst was placed in a stainless steel tube 25 mm. wide, which was heated by means of a steam jacket and provided with a temperature control device. A mixture of 750 grams/hr. acetic acid in vapor form, 750 normal liters/hr. (measured at N.T.P.) ethylene and 450 normal liters/hr. air was passed over the catalyst at a temperature of 180° C. and under a pressure of 6 atmospheres absolute. The reaction gas was cooled using water and a freezing mixture to condense out the reaction product and unreacted acetic acid. The analysis of the reaction mixture indicated a space/time yield of 50 grams vinyl acetate per liter of catalyst per hour.

EXAMPLE 2

One liter of the catalyst carrier material of example 1 was impregnated with a solution of 7.8 grams palladium acetate, 20 grams potassium acetate and 18 grams uranyl acetate $(UO_2(CH_3COO)_2 \cdot 2\ H_2O)$ in acetic acid. The solution was used in a quantity just sufficient to permit absorption thereof by the catalyst mass. The catalyst so impregnated was dried in vacuo at 50° C. and immediately placed in the reaction furnace, without any further treatment. The carrier catalyst so made was found to contain 1.5 percent by weight palladium acetate, 3.85 percent by weight potassium acetate and 3.17 percent by weight anhydrous uranyl acetate. Under the conditions described in example 1, the catalyst was found to produce a space/time yield between 90 and 100 grams vinyl acetate per liter of catalyst per hour, for an average yield of 88 to 89 percent, referred to the ethylene transformed. The catalytic activity could not be found to have dried down, after an operation period of 4 weeks.

EXAMPLE 3

The dried catalyst of example 2 was irradiated for 4 hours using a 700 watt ultraviolet lamp, at a distance of 60 cm. Under the conditions reported in example 1, the catalyst so activated was found to produce a space/time yield of 160 grams vinyl acetate per liter of catalyst per hour, for an average yield of 89 to 90 percent, referred to the ethylene transformed. The catalytic activity could not be found to have died down, after an operation period of 4 weeks.

We claim:

1. A process for the manufacture of vinyl acetate by reaction of ethylene and acetic acid with molecular oxygen or air, in the gas phase, at elevated temperature and in contact with a carrier catalyst, which comprises carrying out the reaction in contact with a carrier catalyst consisting essentially of palladium acetate, alkali metal acetate, uranyl acetate and a carrier.

2. The process of claim 1, wherein the carrier is selected from the group consisting of silicic acid, kieselguhr, silica gel, diatomaceous earth, aluminum oxide, aluminum silicate, aluminum phosphate, pumice, silicon carbide, asbestos and active carbon.

3. The process of claim 1, wherein the carrier catalyst consists essentially of 0.1 to 20 percent by weight palladium acetate, 0.1 to 20 percent by weight of uranyl acetate and a carrier.

4. The process of claim 1, wherein the carrier catalyst consists essentially of 0.2 to 10 percent by weight palladium acetate, 0.2 to 10 percent by weight acetate, 0.2 to 8 percent by weight of uranyl acetate and a carrier.

5. The process of claim 1, wherein the dry, powdery carrier catalyst is irradiated with ultraviolet light, prior to using it.

6. The process of claim 1 wherein the dry, powdery carrier catalyst is irradiated with visible light, prior to using it.

7. The process of claim 1, wherein the dry, powdery carrier catalyst is irradiated with ultraviolet light and visible light, prior to using it.

* * * * *

UNITED STATES PATENT OFFICE
CERTIFICATE OF CORRECTION

Patent No. 3,627,821    Dated December 14, 1971

Inventor(s) Kurt Sennewald et al.

It is certified that error appears in the above-identified patent and that said Letters Patent are hereby corrected as shown below:

In the Claims:

Claim 3, line 3 (Column 3, line 12), after "by weight" insert --alkali metal acetate, 0.1 to 10 percent by weight--;

Claim 4, line 3 (Column 4, line 3), after "by weight" insert --alkali metal--.

Signed and sealed this 28th day of November 1972.

(SEAL)
Attest:

EDWARD M. FLETCHER, JR.
Attesting Officer

ROBERT GOTTSCHALK
Commissioner of Patents